(12) United States Patent     (10) Patent No.:   US 12,644,904 B2

Szulga et al.     (45) Date of Patent:    Jun. 2, 2026

(54) UNDULATED AERONAUTICAL PROBE

(71) Applicant: THALES, Courbevoie (FR)

(72) Inventors: Natacha Szulga, Valence Cedex (FR);
Romain Hodot, Valence Cedex (FR);
Lilian Cauchard, Valence Cedex (FR)

(73) Assignee: THALES, Courbevoie (FR)

( * ) Notice: Subject to any disclaimer, the term of this
patent is extended or adjusted under 35
U.S.C. 154(b) by 351 days.

(21) Appl. No.: 18/550,452

(22) PCT Filed: Mar. 16, 2022

(86) PCT No.: PCT/EP2022/056880

§ 371 (c)(1),
(2) Date: Sep. 13, 2023

(87) PCT Pub. No.: WO2022/194961

PCT Pub. Date: Sep. 22, 2022

(65) Prior Publication Data

US 2024/0248113 A1     Jul. 25, 2024

(30) Foreign Application Priority Data

Mar. 17, 2021    (FR) ....................................... 2102642

(51) Int. Cl.
*G01P 5/14*       (2006.01)

(52) U.S. Cl.
CPC ..................................... *G01P 5/14* (2013.01)

(58) Field of Classification Search
CPC ........ G01P 13/025; G01P 5/165; G01P 13/02;
G01P 5/14; G01P 5/16; G01P 5/00; G01P
5/02; G01P 5/12; G01P 5/245; G01P
21/025; G01P 5/07; G01P 5/04; G01P 1/02; G01P 1/08; G01P 5/10; G01P 5/06;
G01P 5/18; G01P 5/26; G01P 13/045;
G01P 5/005; G01P 5/08; G01P 21/00;
G01P 3/62; G01P 5/175; G01P 5/24;
G01P 15/00; G01P 15/036; G01P 5/006;
G01P 5/083; G01P 5/086; G01P 5/241;
G01P 7/00; G01P 5/001; B64D 43/02;
B64D 15/20; B64D 43/00; B64D 15/12;
B64D 1/18; B64D 1/20; B64D 15/16;
B64D 15/22; B64D 2033/0286; B64D
33/02; B64D 45/00; B64D 33/08
(Continued)

(56) References Cited

U.S. PATENT DOCUMENTS 5,144,251 A  *   9/1992   Fasching .................. G01B 7/00
                                          73/861.73
5,233,865 A  *   8/1993   Rossow .................. G01P 5/165
                                          73/147
(Continued)

FOREIGN PATENT DOCUMENTS

WO       WO-8300217 A1 *   1/1983        G01P 5/165

OTHER PUBLICATIONS

FR 2102642, INPI Rapport de Recherche Preliminaire, Nov. 25,
2021, 2 pages.
(Continued)

*Primary Examiner* — Andre J Allen

(74) *Attorney, Agent, or Firm* — Soquel Group LLC

(57)                ABSTRACT

An aeronautical probe that presents a generally profiled
shape, is provided with a fixing base and has undulations on
at least part of its leading edge.

12 Claims, 7 Drawing Sheets

(58) Field of Classification Search
USPC ....................................................... 73/170.02
See application file for complete search history.

(56) References Cited

U.S. PATENT DOCUMENTS

| | | | | |
|---|---|---|---|---|
| 5,576,488 A * | 11/1996 | Sheplak | .................... | G01P 5/12 |
| | | | | 73/204.26 |
| 6,915,687 B2 * | 7/2005 | Foster | .................. | G01P 13/025 |
| | | | | 73/170.02 |
| 11,530,937 B2 * | 12/2022 | Perez | ........................ | G01P 5/14 |
| 11,624,637 B1 * | 4/2023 | Isebrand | .................. | G01F 1/46 |
| | | | | 73/861.65 |
| 11,662,235 B2 * | 5/2023 | Isebrand | ................ | B64D 15/12 |
| | | | | 73/861.65 |
| 2005/0000280 A1 | 1/2005 | Foster et al. | | |
| 2014/0251000 A1 | 9/2014 | Doolittle et al. | | |
| 2015/0012155 A1 * | 1/2015 | Mandle | ................ | G01C 21/005 |
| | | | | 701/14 |
| 2015/0103864 A1 | 4/2015 | Schwie et al. | | |
| 2017/0030941 A1 | 2/2017 | Sarno et al. | | |
| 2018/0017591 A1 | 1/2018 | Doolittle et al. | | |

OTHER PUBLICATIONS

International Search Report, PCT /EP2022/056880, Jun. 22, 2022, 2 pages.

* cited by examiner

UNDULATED AERONAUTICAL PROBE

CROSS-REFERENCE TO RELATED APPLICATIONS

This application claims benefit under 35 USC § 371 of PCT Application No. PCT/EP2022/056880 entitled AERONAUTICAL PROBE, filed on Mar. 16, 2022 by inventors Natacha Szulga, Romain Hodot and Lilian Cauchard. PCT Application No. PCT/EP2022/056680 claims priority of French Patent Application No. 21 02642, filed on Mar. 17, 2021.

FIELD OF THE INVENTION

The present invention relates to an aeronautical probe, in particular for an aircraft.

BACKGROUND OF THE INVENTION

These probes are protruding objects, often oblong, which are immersed in a flow.

An example of such a probe can be found in U.S. Pat. No. 10,416,188.

A probe is part of a system of instruments for measuring flight conditions, such as, speed, altitude, angle of incidence, temperature and so on.

Indeed, systems can be used, constituted of:

different single-function probes (moving-element AOA probes, plus total pressure probes, plus static pressure probes, plus temperature probes). Such a system usually comprises a Pitot probe, one or more static pressure taps, incidence probes, as well as related instruments such as an anemometer, altimeter and variometer. The static pressure measurement system is used to measure the elements on which the forces acting on the aircraft depend, such as the density, pressure and viscosity of the fluid in which the aircraft is flying. Each pressure sensor (static or total) requires a pressure transducer to operate. The angle of incidence sensor requires an angular sensor.

fixed or moving multifunction probes, each sensitive to all flow parameters (total pressure, static pressure and incidence, for example), which can advantageously replace static pressure, total pressure and incidence probes. Or even, for example, a network of numerous static pressure probes, each measuring the pressure at a specific point on the aircraft fuselage. This system then allows to reconstruct the pressure field around the equipped aircraft, and to deduce flight conditions by computer processing.

The multifunction probes present the advantage of being able to measure at least three elements of flight conditions, most often total pressure, static pressure and incidence.

Among the multifunction probes, the fixed multifunction probes present the advantage of having no moving parts, unlike moving multifunction probes.

These moving parts can be sources of failure or even incidents, for example due to blockage caused by frost or the intrusion of dust or sand into the mechanism of the rotating part.

But blocking of the moving part results in a loss of incidence information.

However, their incidence performance is proven when they are not blocked.

The concept of fixed multifunction pneumatic probes has been around for several decades, but their incidence performance is not as good as that of moving multifunction probes, particularly at high incidence.

However, they are not sensitive to blockage, as they have no moving mechanical parts.

SUMMARY OF THE DESCRIPTION

The aim of the invention is therefore to solve these problems by proposing a reliable and precise probe, including incidence, in particular for high incidence.

Thus, the problem to be solved can be summed up as follows: how to ensure accurate measurement of total pressure, static pressure and incidence, with accuracy and minimal risk of blockage of moving elements. Generally speaking, the invention relates to improving the sensitivity and accuracy performance of aeronautical probes.

An example of a Pitot-type probe presenting a flow control device for improved accuracy is shown in U.S. Pat. No. 10,416,188. The Pitot-type probe presents a cylindrical tube mounted on a mast. The patent presents different shapes for the total pressure pick-up, allowing a boundary layer, at the limit of turbulence, to be generated along the tube. Indeed, this allows the accuracy of static pressure measurement to be improved, provided the taps are located on the tube. This solution is not satisfactory, however, as it is only suitable for one type and one geometry of probe.

The present invention has as its object an aeronautical probe, characterized in that it presents a generally profiled shape, fitted with a fastening base and of which at least part of the leading edge includes undulations.

Further features of the probe according to the invention, taken alone or in combination, are as follows:

the undulations are described by a sinusoidal function;
the sinusoidal function is of the type $$y = A(x)\sin\left(\frac{\pi x}{\lambda}\right)$$

where x is the distance to the upstream tip of the probe, A(x) is the amplitude of the undulations, a function of the chord (C(x)) and A is the wavelength of the leading-edge undulations;

the tip of the probe opposite its fastening base includes a total pressure tube able to be connected by a pipe to a total pressure sensor;

each side of the probe includes static pressure taps;

the static pressure taps are arranged symmetrically on each side of the probe;

the static pressure taps open on each side of the probe into a corresponding static pressure chamber;

each static pressure chamber is equipped with a water trap;

the static pressure chambers are connected by corresponding pipes, on the one hand, to absolute pressure determining means to determine the static pressure, and on the other hand, to differential pressure determining means to determine the incidence;

the water traps of the pressure chambers are provided around the junctions of these with the pipes;

it is produced by 3D printing.

BRIEF DESCRIPTION OF THE DRAWINGS

The invention will be better understood on reading the following description, given by way of example only and made with reference to the appended drawings, on which.

DETAILED DESCRIPTION OF EMBODIMENTS

Figure 1:
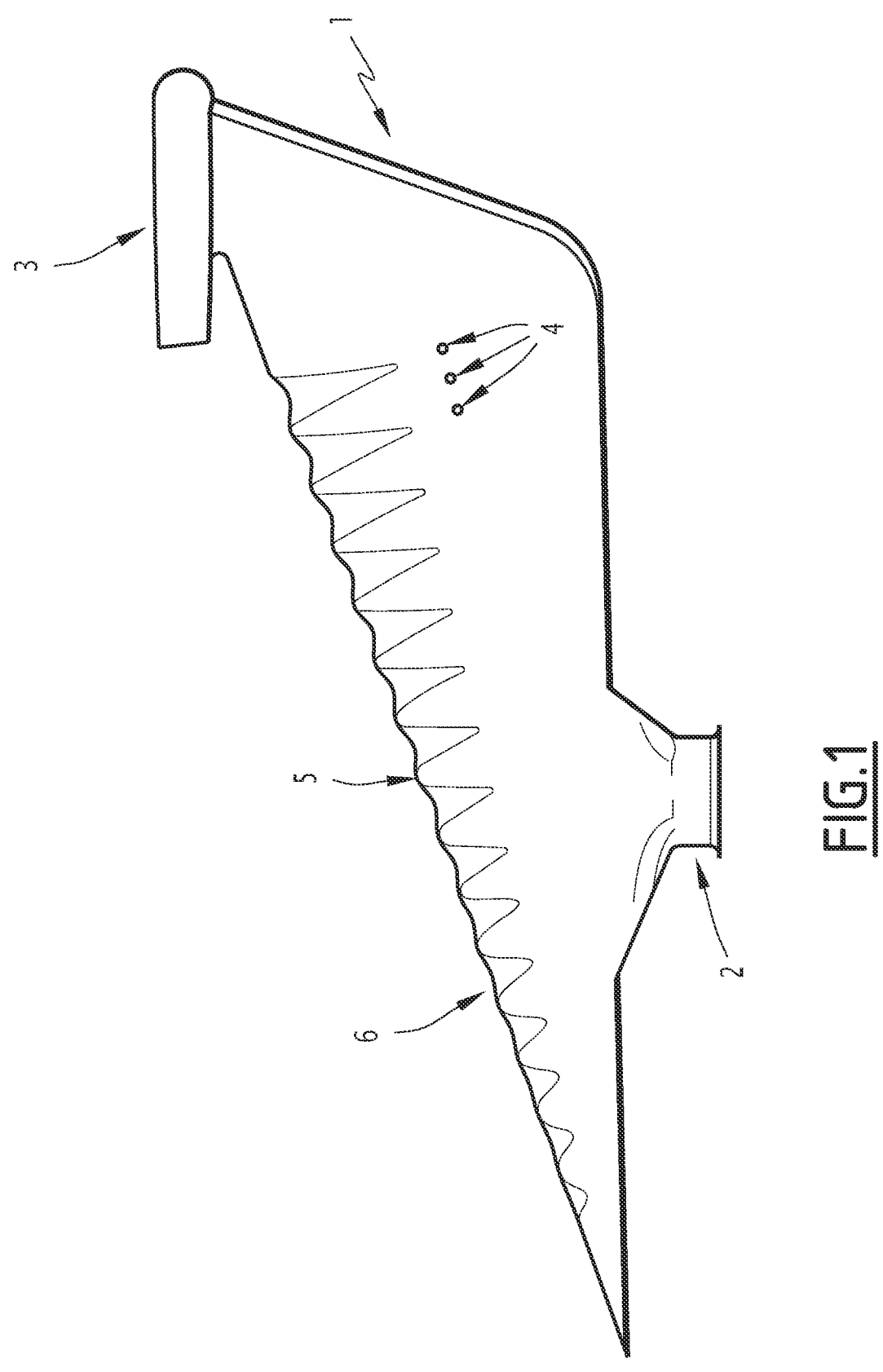
FIG. 1 shows a side view of a probe according to the invention.

These figures, and FIG. 1 indeed, illustrate one example of the embodiment of an aeronautical probe, in particular for aircraft, according to the invention.

This is designated by the general reference 1 on this figure, and belongs, for example, to the family of fixed pneumatic multifunction probes.

In fact, this probe 1 therefore presents in the shape, for example, of a symmetrical thin profiled body, and, for example, in a generally triangular shape.

In particular, by a "thin" profile, is meant a profile of low thickness relative to its length. For example, the ratio of thickness to length of such a profile is less than 20%, advantageously less than 10% and, in some examples, less than 8%. Advantageously, this profile is also of low camber. In the symmetrical case, such camber is zero.

Of course, other types of embodiments of this probe can also be envisaged.

This probe 1 is then provided with a fastening base for attachment, for example, to the rest of the aircraft, this base being designated by the general reference 2.

At its tip opposite this base, the probe includes a total pressure tube designated by general reference 3.

The profiled body is also fitted with a number of static pressure taps, designated by general reference 4 on these figures.

These are distributed symmetrically around the profiled body of the probe 1 and are designed to measure static pressure by the average of the perceived pressures and incidence by the perceived pressure differential.

As also illustrated, the probe according to the invention includes a leading edge designated by the general reference 5. As is well known, the leading edge 5 corresponds to a part of the surface of the probe 1 facing the flow. This part is particularly visible in FIG. 7, where the arrows indicate the direction of the incident air flow when it encounters the leading edge 5.

As shown, at least part of this leading edge 5 includes undulations designated by the general reference 6.

In fact, the undulations 6 are described by a sinusoidal function which may be, for example, of the type $$y = A(x)\sin\left(\frac{\pi x}{\lambda}\right)$$

where x is the distance to the upstream tip of the probe, A(x) is the amplitude of the undulations, a function of the chord (C(x)) and λ is the wavelength of the leading edge undulations.

Note that the amplitude of these undulations is greatest at the leading edge 5 and decreases as the distance increases from the leading edge 5 (in other words, toward the left in the example of the figures).

Figure 7:
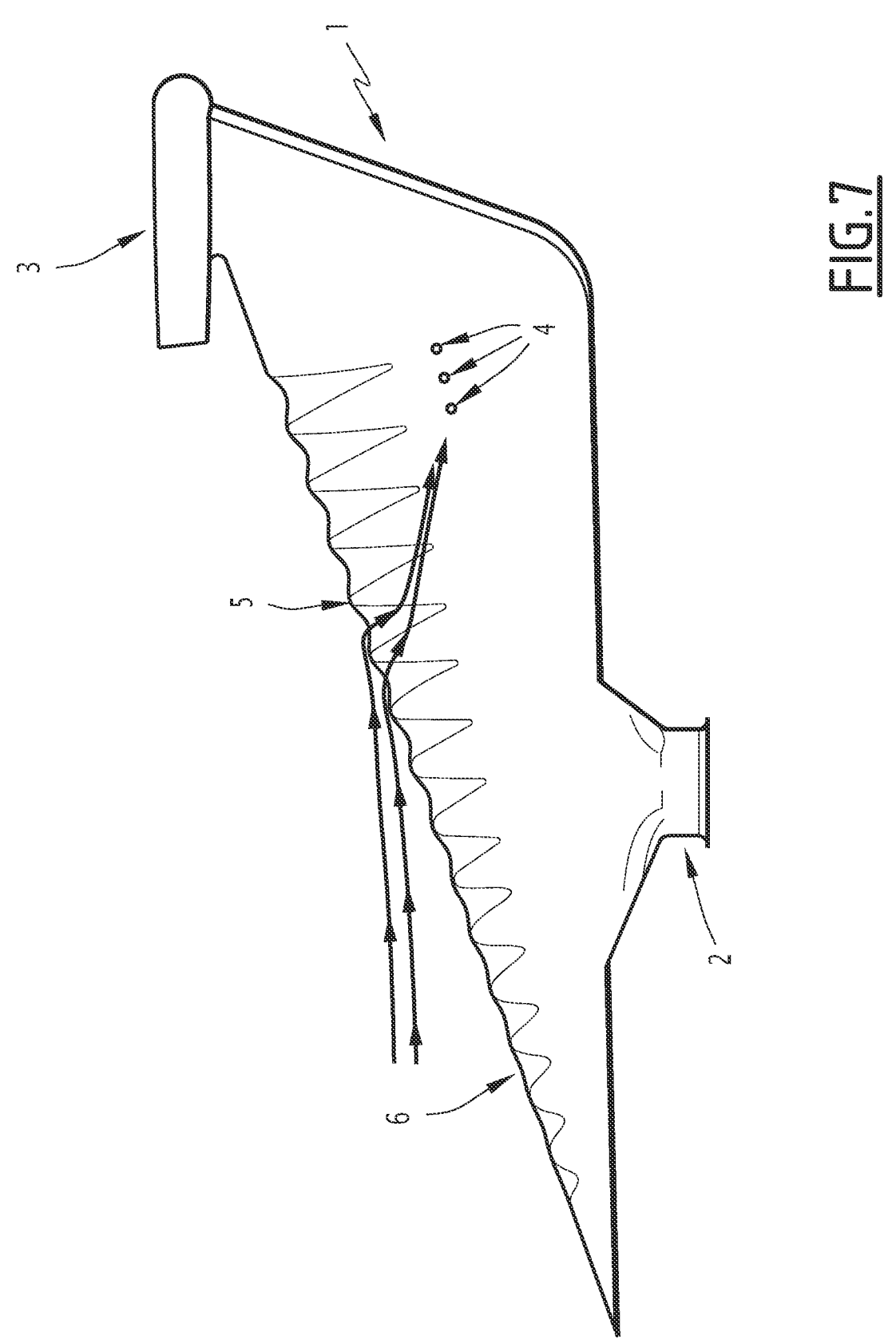
FIG. 7 illustrates a view similar to that of FIG. 1, in which one direction of air flow is shown.

It should also be noted that, as illustrated in FIG. 7, on encountering the leading edge 5, the airflow locally changes direction to take on an orientation that tends to approach the direction normal to the leading edge 5. In other words, on contact with the leading edge 5, the direction of the airflow changes locally to substantially follow the undulations and, therefore, the direction normal to the leading edge 5. The undulations of the leading edge 5 are therefore configured to direct the incident airflow towards the direction normal to the leading edge 5.

Figure 2:
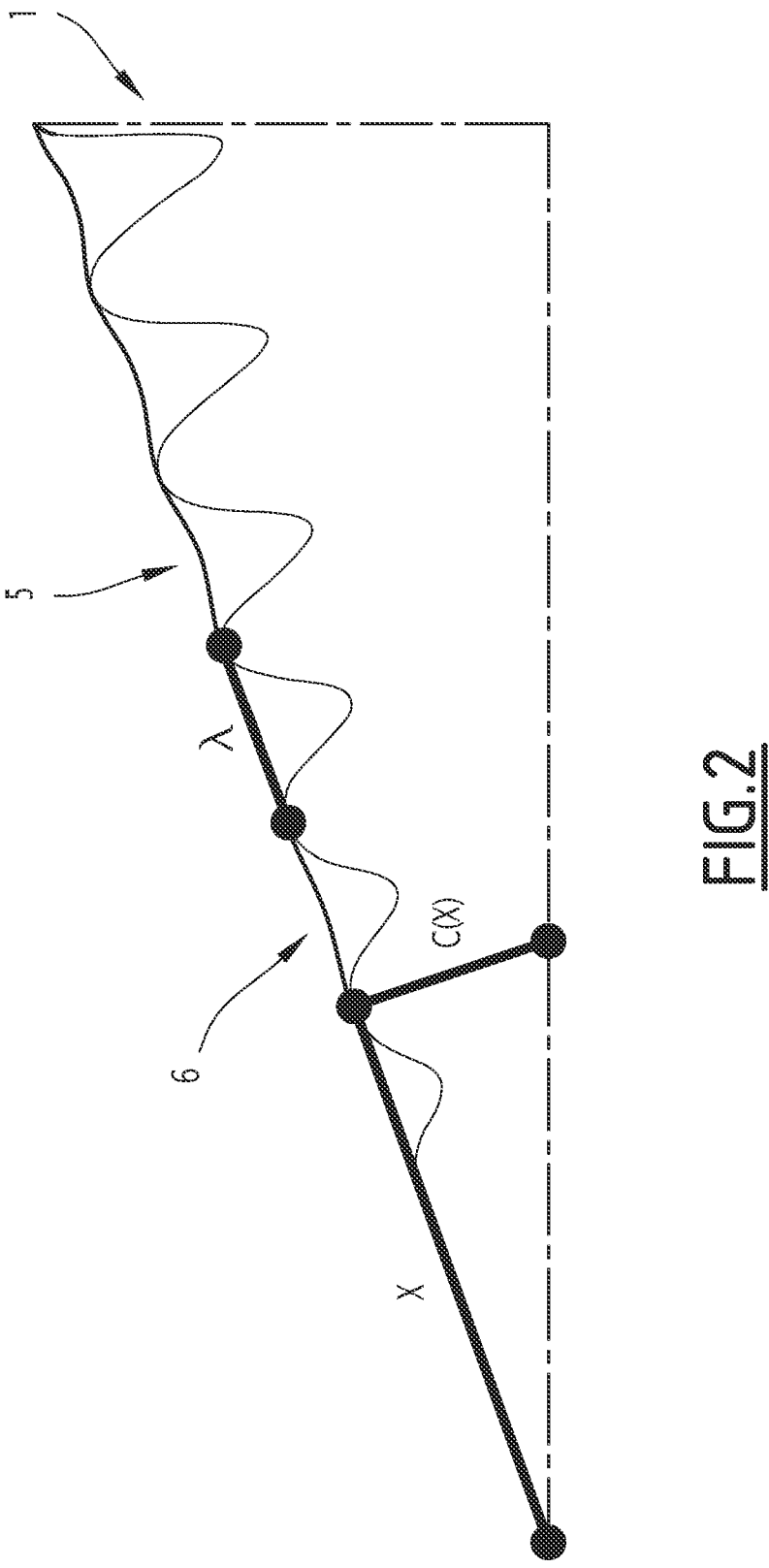
FIG. 2 illustrates in greater detail the creation of a leading edge of this probe.

FIG. 2 shows in greater detail the various parameters and undulations described above.

This undulated leading edge 5 of the probe 1 serves to prevent boundary layer separation, which occurs when a thin profile is placed at certain incidences in a flow.

This boundary layer separation manifests itself by a zone of recirculation around the profile, accompanied by a drastically lower pressure than elsewhere on the profile.

As incidence increases, the separated boundary layer zone expands, as does the zone of very low pressure.

But within the separated regions, the pressure remains almost constant as a function of incidence.

Eliminating this boundary layer separation with an undulating leading edge allows greater symmetry to be achieved in the evolution of pressures measured on each side of the probe.

Furthermore, and as will be described in more detail later, two static pressure chambers can be provided, symmetrically located on either side of the proposed fixed multifunction probe.

The incidence is then calculated as the differential of the measured pressures, and the static pressure as their average.

Having the most symmetrical development of the pressures measured on each side of the probe allows the most stable static pressure possible to be obtained as a function of incidence, and a measured incidence that varies monotonically and without inflection points, in other words, without a break in slope, with the true incidence.

Of course, leading-edge undulations of this kind can also find use on the mast of an L-type multifunction probe, or similarly to that of a static PITOT-type probe.

In this case, the static pressure taps must be located on the mast to benefit from the separation-retarding effect of the leading edge undulations.

Furthermore, the undulations described above can also be used on the rotating element of an incidence or skid sensor (AOA or SSA).

By harmonizing the pressures on the faces of this rotating element, they allow it to be better stabilized.

Thus, the accuracy of the angle-measuring probes with rotating elements are improved.

As already mentioned above, in the probe according to the invention, various tubes and taps are connected to the sensors.

Figure 3:
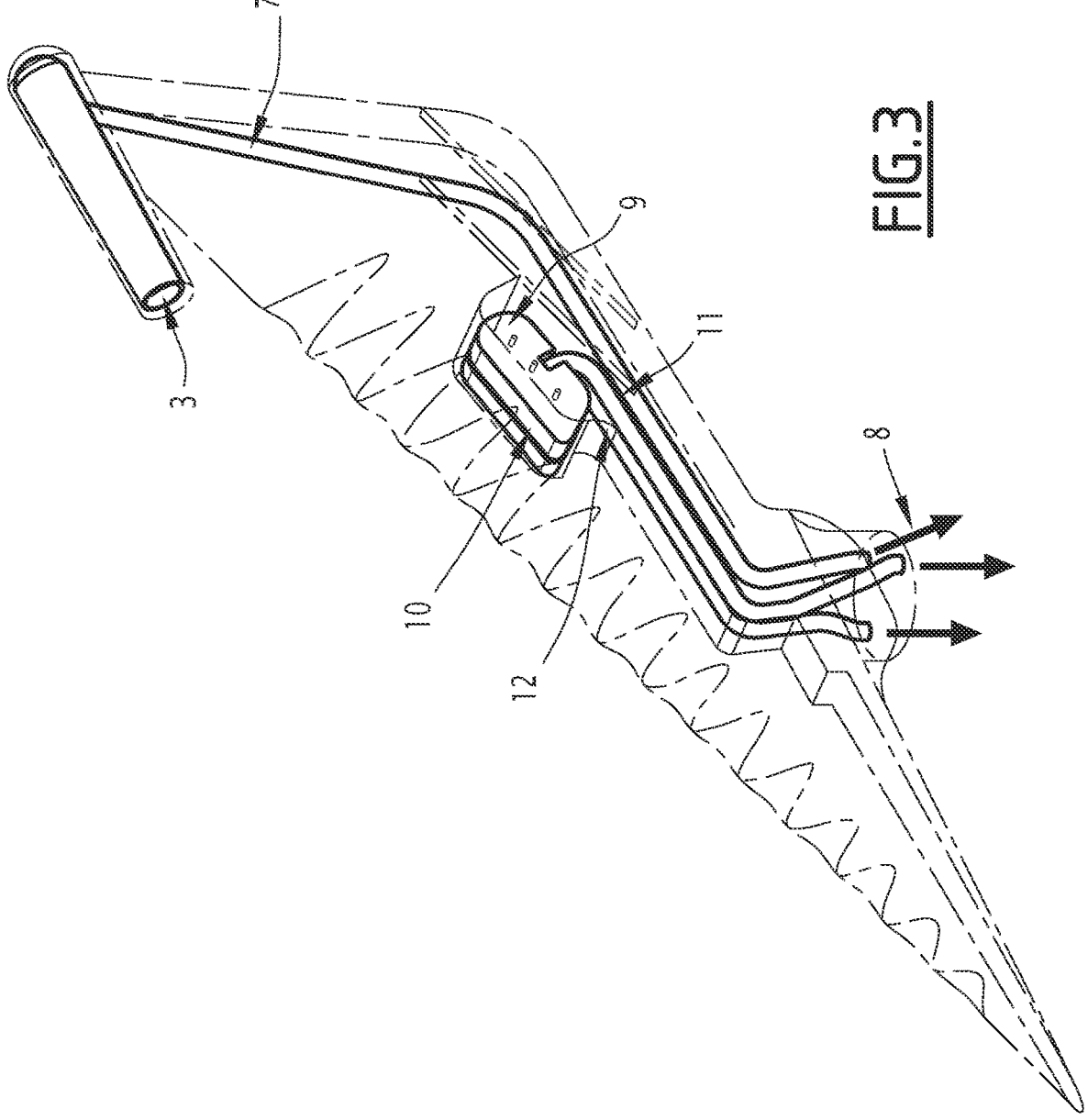
FIG. 3 illustrates the connection of the various tapping points of a probe according to the invention.

FIG. 3 illustrates an example of how these different tubes and sensors are connected.

In fact, and as illustrated, the total pressure tube designated by the general reference 3, is able to be connected by a pipe 7, to a total pressure sensor.

This pipe 7 then passes through the profile until it exits at 8 to reach the sensor.

The static pressure taps 4 open out on either side of the sensor profile, into a static pressure chamber, for example, 9 and 10. Each of these static pressure chambers then opens into a corresponding connecting pipe.

These connecting pipes are designated by references 11 and 12 respectively, and also open out at 8 to exit the probe.

Thus, these outlets can be connected to absolute pressure determining means to determine static pressure, and to differential pressure determining means to determine incidence.

For this purpose, for example, an absolute pressure sensor or a differential pressure sensor can be used, or the single pressure sensors connected to means for processing their output information to obtain this differential pressure.

Figure 4:
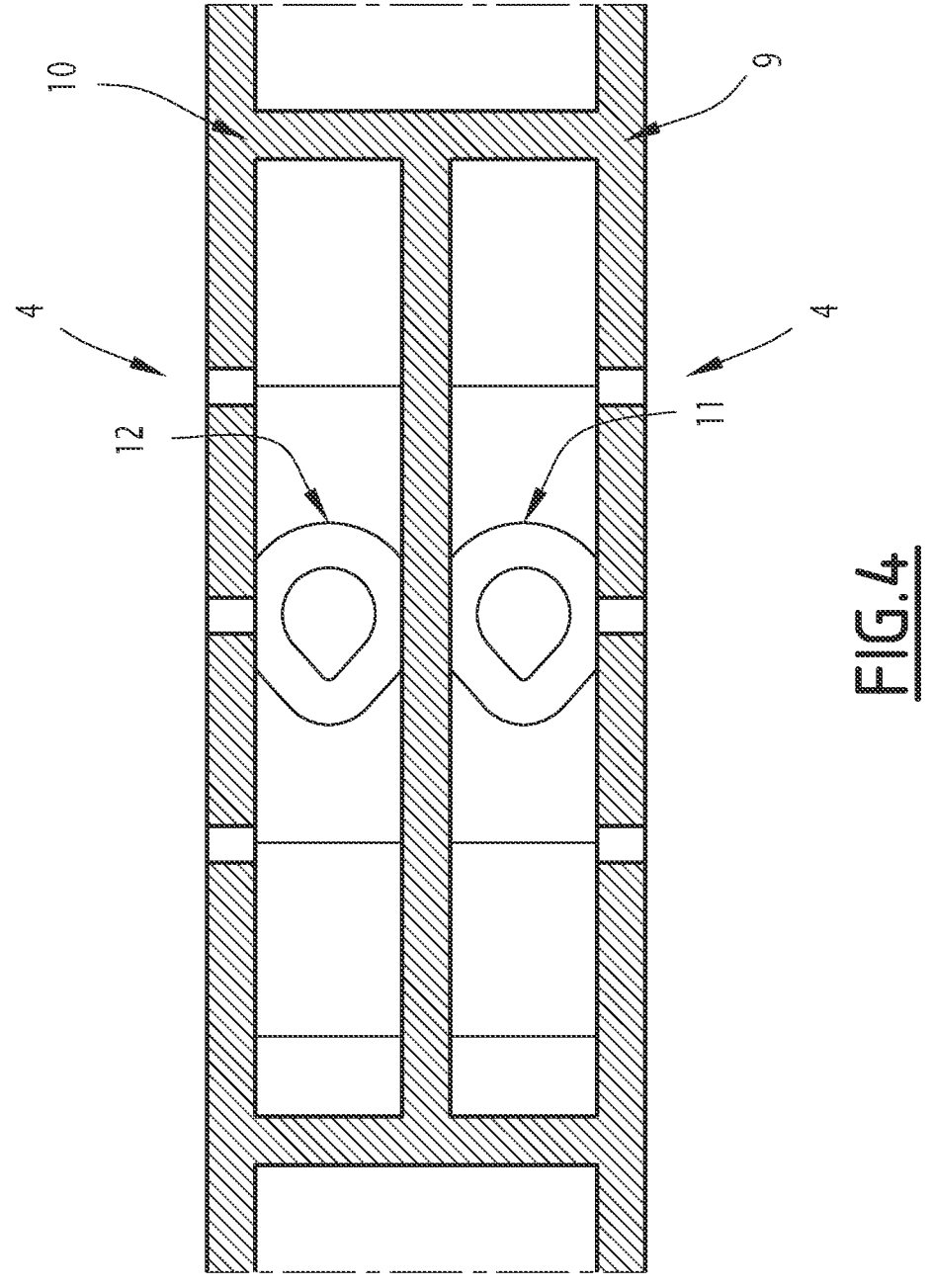
FIGS. 4 and 5 show, respectively, longitudinal and vertical cross-sectional views of one or more static pressure chambers used in a probe according to the invention.

As shown in FIG. 4, the static pressure taps 4, which may present a millimeter-sized diameter, open into one of the static pressure chambers 9 and 10.

These chambers have the same dimensions and are located symmetrically on either side of the probe profile.

Their geometry is symmetrical so as not to introduce additional factors to the pressure differential obtained when the probe is brought into incidence.

Figure 5:
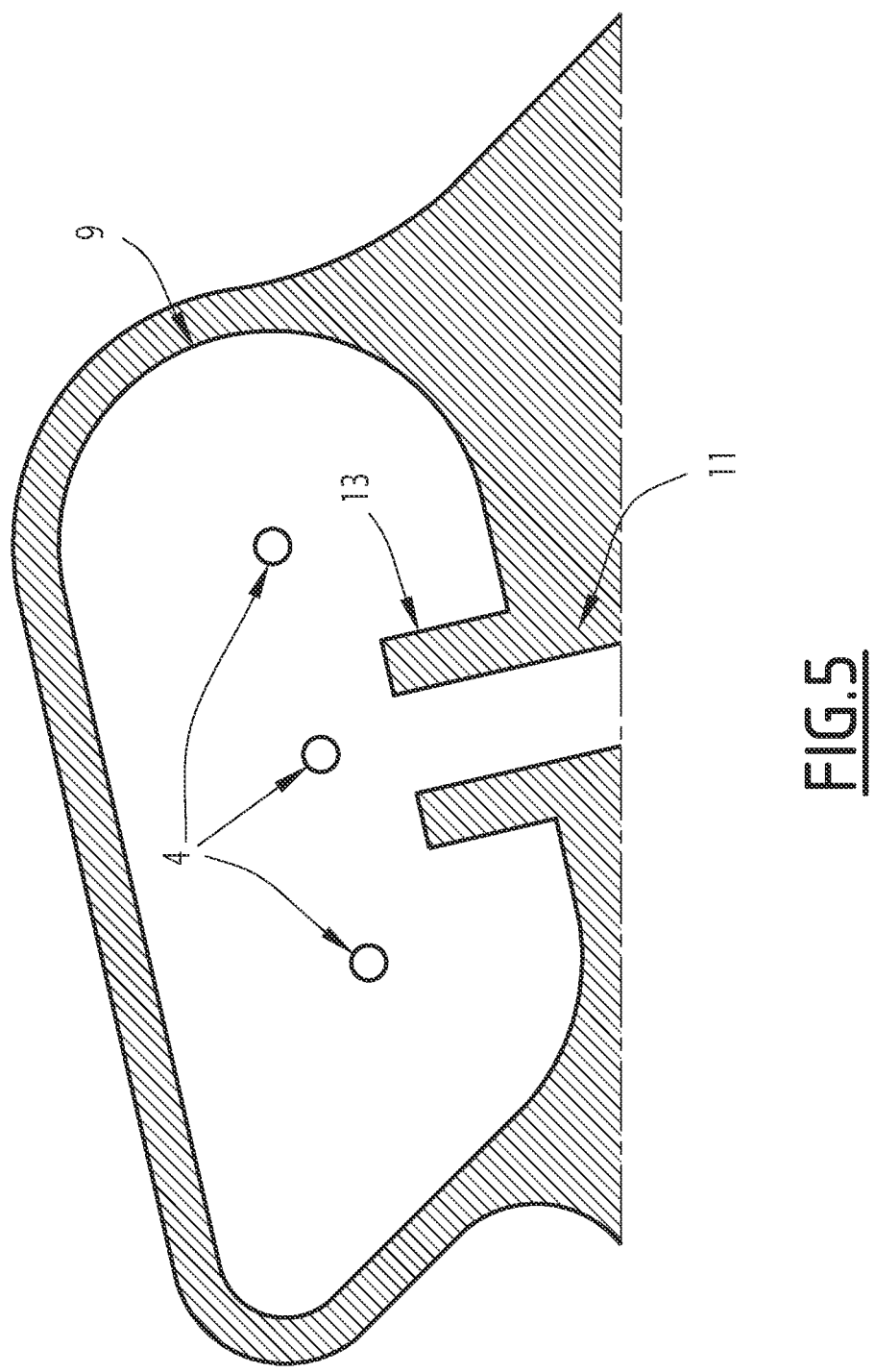

FIG. 5 shows a more detailed cross-section of a static pressure chamber, such as the one designated by general reference 9.

The static pressure taps 4 then open into this pressure chamber 9.

The shape of the chamber is elongated at one corner so that it can be manufactured, for example, by additive manufacturing, in other words, 3D metal printing.

Each of the pressure chambers is equipped with a water trap, designated by the general reference 13 on this FIG. 5 for chamber 9.

This water trap is provided, for example, around the junctions of these chambers with corresponding pipes and in particular of chamber 9 with pipe 11 as illustrated.

The same applies to chamber 10 with the pipe 12.

In fact, these traps are formed by a flange-shaped portion the purpose of which is to capture any drops of water or other matter that may enter the chamber. These drops are then evacuated or eliminated by, for example evaporation, using a heating system.

Because of its particular geometry, and because of the relatively complex sinusoidal undulations to produce by machining, it is recommended to use a metal 3D printing process, in other words, additive manufacturing, for this probe, as mentioned above.

Figure 6:
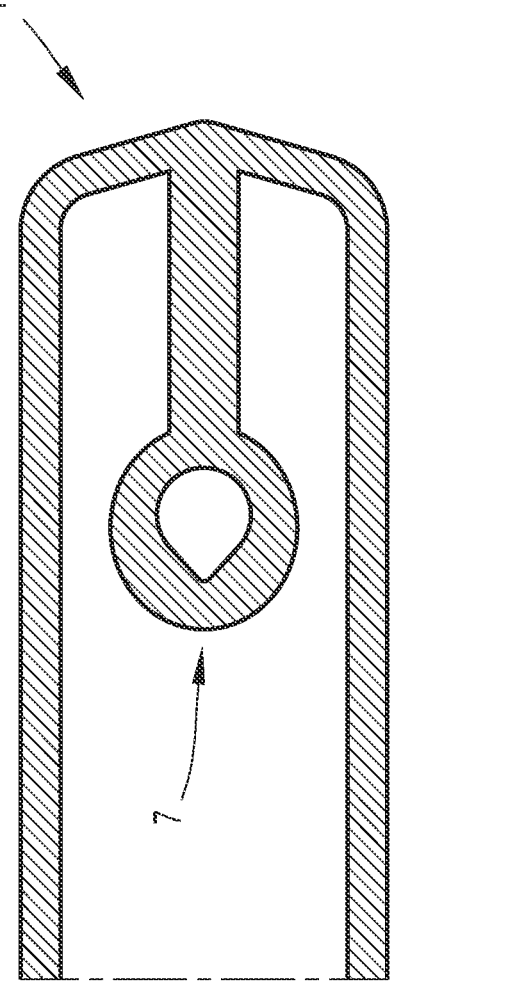
FIG. 6 illustrates a cross-sectional view of a total pressure tube used in a probe according to the invention.

For this reason, and as shown, the internal cross-section of the tubes or the connecting pipes for static and total pressure, for example, can be teardrop-shaped, as illustrated in FIG. 6 for the pipe 7.

Thus, the probe according to the invention can measure incidence, static pressure and total pressure without a rotating moving part.

The leading edge undulations prevent boundary layer separation, symmetrizing the pressure distribution around the probe.

Indeed, the aeronautical probes are generally equipped with anti-icing systems. In most cases, these systems consist of a thermo-resistive element. The heat generated due to the Joule effect allows the probe to be heated and prevents supercooled water droplets or crystals from adhering. If frost were to accrete on the undulated leading edge, its effectiveness would be greatly impacted. The boundary layer would lift off and the measured static pressure would be incorrect.

The sinusoidal shape of the undulations limits the possibility of accretion, compared with the crenellated shapes with discontinuous derivatives. This allows the heating power required by the anti-icing system to be limited and makes it easier to ensure that the device operates correctly in icing conditions.

This results in a more monotonic increase in incidence measurement relative to the true incidence of the aircraft, especially at higher incidences.

By using the same pressure taps to calculate incidence and static pressure, it allows a simplified architecture for the interior of the fixed multifunction probe to be proposed.

Of course, other embodiments and shapes and types of probes (multifunction, AOA-SSA, TAT . . . ) may also be considered.

The invention claimed is:

1. An aeronautical probe presenting a thin profiled shape, comprising a fastening base and of which at least part of a leading edge comprises undulations that are described by a sinusoidal function.

2. The aeronautical probe according to claim 1, wherein the sinusoidal function is of the type $$y = A(x)\sin\left(\frac{\pi x}{\lambda}\right)$$

where x is the distance to the upstream tip of the probe, A(x) is the amplitude of the undulation, a function of a chord and $\lambda$ is the wavelength of the leading edge undulation.

3. The aeronautical probe, according to claim 1, wherein the tip of the probe opposite said fastening base comprises a total pressure tube connected by a pipe to a total pressure sensor.

4. The aeronautical probe according to claim 1, wherein each side of the probe comprises static pressure taps.

5. The aeronautical probe according to claim 4, wherein said static pressure taps are arranged symmetrically on each side of the probe.

6. The aeronautical probe according to claim 4, wherein said static pressure taps open out on each side of the probe into a corresponding static pressure chamber.

7. The aeronautical probe according to claim 6, wherein each static pressure chamber comprises a water trap.

8. The aeronautical probe according to claim 7, wherein the static pressure chambers are connected by corresponding pipes on the one hand to an absolute pressure determining means for determining the static pressure, and on the other hand to a differential pressure determining means for determining the incidence.

9. The aeronautical probe according to claim 7 wherein said water traps of the pressure chambers are provided around the junctions of these with the pipes.

10. The aeronautical probe according to claim 1, produced by 3D printing.

11. The aeronautical probe according to claim 1, wherein it defines undulations of maximum amplitude at the leading edge.

12. The aeronautical probe according to claim 1, wherein said undulations at the leading edge direct an incident airflow towards the direction normal to the leading edge.

* * * * *